US012480890B2

(12) United States Patent
Theagarajan et al.

(10) Patent No.: US 12,480,890 B2
(45) Date of Patent: Nov. 25, 2025

(54) DEEP LEARNING BASED MODE SELECTION FOR INSPECTION

(71) Applicant: KLA Corporation, Milpitas, CA (US)

(72) Inventors: Rajkumar Theagarajan, Milpitas, CA (US); Yujie Dong, Newark, CA (US); Jing Zhang, Santa Clara, CA (US); Brian Duffy, San Jose, CA (US); Atiqur Rahman Chowdhury, Milpitas, CA (US); Kris Bhaskar, San Jose, CA (US); Yang Li, San Jose, CA (US); Graham Jensen, Milpitas, CA (US)

(73) Assignee: KLA CORPORATION, Milpitas, CA (US)

( * ) Notice: Subject to any disclaimer, the term of this patent is extended or adjusted under 35 U.S.C. 154(b) by 47 days.

(21) Appl. No.: 18/646,704

(22) Filed: Apr. 25, 2024

(65) Prior Publication Data

US 2025/0020598 A1   Jan. 16, 2025

Related U.S. Application Data

(60) Provisional application No. 63/513,840, filed on Jul. 14, 2023.

(51) Int. Cl.
*G01N 21/95* (2006.01)
*G06T 7/00* (2017.01)

(52) U.S. Cl.
CPC ....... *G01N 21/9501* (2013.01); *G06T 7/0004* (2013.01); *G01N 2201/1296* (2013.01); *G06T 2207/30148* (2013.01)

(58) Field of Classification Search
CPC ........ G01N 21/9501; G01N 2201/1296; G06T 7/0004; G06T 2207/30148
See application file for complete search history.

(56) References Cited

U.S. PATENT DOCUMENTS

| 8,126,255 | B2 | 2/2012 | Bhaskar et al. |
| 8,664,594 | B1 | 3/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |

(Continued)

OTHER PUBLICATIONS

International Search Report and Written Opinion for PCT/US2024/036845 mailed Oct. 17, 2024.

*Primary Examiner* — Jamil Ahmed
(74) *Attorney, Agent, or Firm* — Entropy Matters LLC

(57) ABSTRACT

Methods and systems for determining information for a specimen are provided. One system includes a computer subsystem and one or more components executed by the computer subsystem that include a setup deep learning (DL) model configured for separately performing defect detection for a specimen based on output generated for the specimen by each of two or more modes of an inspection system, respectively, and separately re-performing defect detection for the specimen based on masked output generated for each of the modes, respectively. The computer subsystem determines a difference between results of separately performing and separately re-performing the defect detections for each of the modes, respectively, and identifies a subset of the modes for which the difference is larger than other modes as candidate mode(s) for inspection of the specimen.

20 Claims, 5 Drawing Sheets

(56) References Cited

U.S. PATENT DOCUMENTS

| | | |
|---|---|---|
| 9,222,895 B2 | 12/2015 | Duffy et al. |
| 9,816,939 B2 | 11/2017 | Duffy et al. |
| 10,867,108 B2 | 12/2020 | Chao |
| 11,010,885 B2 | 5/2021 | Brauer et al. |
| 2017/0140524 A1* | 5/2017 | Karsenti ............... G06T 7/0004 |
| 2021/0334946 A1 | 10/2021 | Buzaglo |
| 2021/0366103 A1 | 11/2021 | Zhang et al. |
| 2023/0136110 A1 | 5/2023 | Yamamoto et al. |

* cited by examiner

DEEP LEARNING BASED MODE SELECTION FOR INSPECTION

BACKGROUND OF THE INVENTION

1. Field of the Invention

The present invention generally relates to methods and systems for determining information for a specimen. Certain embodiments relate to identifying one or more candidate modes for inspection of a specimen using a deep learning model and differences between defect detection performed with inspection system output and masked inspection system output.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Many different approaches for setting up the output generation (e.g., imaging) parameters of processes such as those described above have been tried and developed. Some currently used approaches include the Brute Force and Greedy search approaches. Given N possible modes, in the Brute Force approach, a user may train multiple convolutional neural network (CNN) models for every possible set of mode combinations until all possible combinations are exhausted. The number of experiments increases exponentially with respect to the number of modes. In Greedy search, the user trains a single mode CNN model for every N mode. From this result, the user selects the top K modes (K<N) and trains a model with the K combination of the modes.

Such currently used approaches have, however, a number of important disadvantages. For example, such previously used approaches require the user to train a CNN model for every possible mode combination which is substantially time and resource consuming. Another disadvantage is that the Greedy search approach does not guarantee that the selected mode combination is the best possible combination. Although the Brute Force approach can guarantee the selected modes is the best combination, it is a substantially exhaustive process and scales at the rate of $2^N-1$ as the number of modes N increases which is not practically feasible for relatively large N.

Accordingly, it would be advantageous to develop systems and methods for determining information for a specimen that do not have one or more of the disadvantages described above.

SUMMARY OF THE INVENTION

The following description of various embodiments is not to be construed in any way as limiting the subject matter of the appended claims.

One embodiment relates to a system configured for determining information for a specimen. The system includes a computer subsystem and one or more components executed by the computer subsystem that include a setup deep learning (DL) model configured for separately performing defect detection for a specimen based on output generated for the specimen by each of two or more modes of an inspection system, respectively. The setup DL model is also configured for separately re-performing defect detection for the specimen based on masked output generated for each of the two or more modes, respectively. The computer subsystem is configured for separately generating the masked output for each of the two or more modes, respectively, by determining a single output value from the output generated for at least a portion of the specimen and replacing all of the output generated for the at least the portion of the specimen with the single output value. The computer subsystem is also configured for determining a difference between results of separately performing the defect detection and separately re-performing the defect detection for each of the two or more modes, respectively. The computer subsystem is further configured for identifying a subset of the two or more modes for which the determined difference is larger than others of the two or more modes as one or more candidate modes for inspection of the specimen. The system may be further configured as described herein.

Another embodiment relates to a computer-implemented method for determining information for a specimen. The method includes separately performing defect detection for a specimen by inputting output generated for the specimen by each of two or more modes of an inspection system, respectively, into a setup DL model included in one or more components executed by a computer system. The method also includes separately generating masked output for each of the two or more modes, respectively, by determining a single output value from the output generated for at least a portion of the specimen and replacing all of the output generated for the at least the portion of the specimen with the single output value. In addition, the method includes separately re-performing defect detection for the specimen by inputting the masked output generated for each of the two or more modes, respectively, into the setup DL model. The method further includes determining a difference between results of separately performing the defect detection and separately re-performing the defect detection for each of the two or more modes, respectively, and identifying a subset of the two or more modes for which the determined difference is larger than others of the two or more modes as one or more candidate modes for inspection of the specimen. Inputting the output, separately generating the masked output, inputting the masked output, determining the difference, and identifying the subset are performed by the computer system. Each of the steps of the method described above may be performed as described further herein. The embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
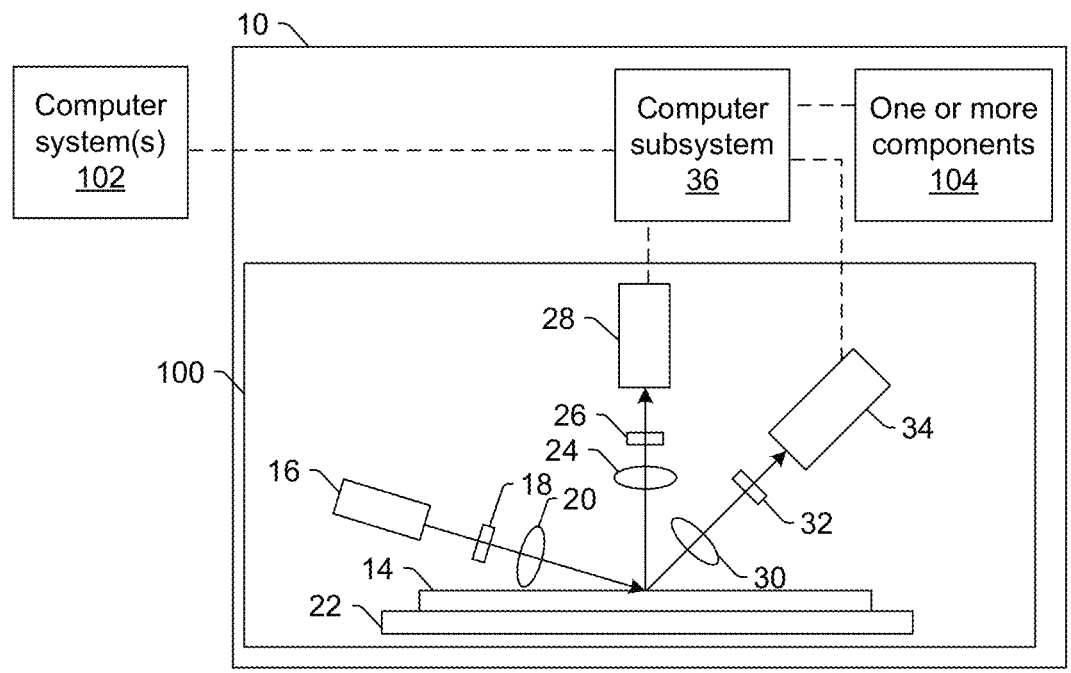
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for determining information for a specimen for inspection applications, e.g., selecting mode(s) for an inspection process performed on the specimen. The embodiments described herein may be used for mode selection for single mode and multi-mode optical or other inspection of specimens such as wafers. More specifically, the embodiments provide a systematic approach to achieve the highest sensitivity from a given set of possible modes in inspection, which can be applied to an inspection system for improving tool sensitivity from a single/multi-mode defect detection perspective while also reducing the cost of ownership of the tool.

The embodiments described herein use deep learning (DL) based models such as convolutional neural network (CNN) models to predict the best possible combination of input modes that can achieve similar sensitivity as using all the modes while reducing compute complexity. A motivation of this approach is to utilize a minimum number of input modes that are responsive to all the defects of interest (DOIs) on the specimen while maintaining the maximum sensitivity using a single CNN model via a supervised manner. One significant advantage of the embodiments described herein is that the user needs to train only one DL model regardless of the number of input modes.

For a given specimen, each of the N modes of a tool such as an inspection system is usually responsive to information of the specimen topography, process condition, process variation, defects, etc. Some of these modes are sensitive to redundant information that is already available in other modes. Some modes can be used to determine significant information that improves the sensitivity over many folds while some have relatively little to no unique information. Therefore, using just a subset of these N modes should achieve similar sensitivity or even higher compared to using all N modes. The embodiments described herein solve this problem, at least in part, by trying to incorporate most of the information contained in the entire set of modes into a possible minimal subset of data. In real applications, this will significantly improve inference performance by reducing the compute time and resources. Moreover, there could be data limitations where certain input modes may not be available across the entire specimen due to problems during the data collection phase, which can cause issues when trying to perform inference using DL models. The embodiments described herein can alleviate this problem because they need only a subset of the whole dataset thereby reducing the possibilities of missing and/or unavailable input modes.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen is shown in FIG. 1. In some embodiments, system 10 includes an inspection system such as inspection system 100. The inspection system includes and/or is coupled to a computer subsystem, e.g., computer subsystem 36 and/or one or more computer systems 102.

In general, the inspection systems described herein include at least an energy source, a detector, and a scanning subsystem. The energy source is configured to generate energy that is directed to a specimen by the inspection system. The detector is configured to detect energy from the specimen and to generate output responsive to the detected energy. The scanning subsystem is configured to change a position on the specimen to which the energy is directed and from which the energy is detected. In one embodiment, as shown in FIG. 1, the inspection system is configured as a light-based inspection system.

In light-based inspection systems, the energy directed to the specimen includes light, and the energy detected from the specimen includes light. In the embodiment of the system shown in FIG. 1, the inspection system includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the inspection system may be configured to alter one or more characteristics of one or more elements of the illumination subsystem such that the light can be directed to the specimen at an angle of incidence that is different than that shown in FIG. 1. In one such example, the inspection system may be configured to move light source 16, optical element 18, and lens 20 such that the light is directed to the specimen at a different oblique angle of incidence or a normal (or near normal) angle of incidence.

In some instances, the inspection system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection system may also include a scanning subsystem configured to change the position on the specimen to which the light is directed and from which the light is detected and possibly to cause the light to be scanned over the specimen. For example, the inspection system may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection system may be configured such that one or more optical elements of the inspection system perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The inspection system further includes one or more detection channels. At least one of the detection channel(s) includes a detector configured to detect light from the specimen due to illumination of the specimen by the inspection system and to generate output responsive to the detected light. For example, the inspection system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection system that includes two detection channels, the inspection system may include a different number of detection channels (e.g., only one detection channel or two or more detection channels). In one such instance, the detection channel formed by collector 30, element 32, and detector 34 may form one side channel as described above, and the inspection system may include an additional detection channel (not shown) formed as another side channel that is positioned on the opposite side of the plane of incidence. Therefore, the inspection system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection system may also include two or more side channels configured as described above. As such, the inspection system may include at least three channels (i.e., one top channel and two side channels), and each of the at least three channels has its own collector, each of which is configured to collect light at different scattering angles than each of the other collectors.

As described further above, each of the detection channels included in the inspection system may be configured to detect scattered light. Therefore, the inspection system shown in FIG. 1 may be configured for dark field (DF) inspection of specimens. However, the inspection system may also or alternatively include detection channel(s) that are configured for bright field (BF) inspection of specimens. In other words, the inspection system may include at least one detection channel that is configured to detect light specularly reflected from the specimen. Therefore, the inspection systems described herein may be configured for only DF, only BF, or both DF and BF inspection. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection system may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the inspection system may be configured to generate images in a number of ways.

FIG. 1 is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the inspection system in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, the computer subsystem may be configured to input the output of the detectors into a setup DL model as described herein. Inputting the detector output may be performed as described further herein.

Computer subsystem 36 may be further configured as described herein. For example, computer subsystem 36 may be configured to perform the steps described herein. As such, the steps described herein may be performed "on-tool," by a computer subsystem that is coupled to or part of an inspection system. In addition, or alternatively, computer system(s) 102 may perform one or more of the steps described herein. Therefore, one or more of the steps described herein may be performed "off-tool," by a computer system that is not directly coupled to an inspection system.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the inspection system is described above as being an optical or light-based inspection system, the inspection system may be configured as an electron beam inspection system. In an electron beam inspection system, the energy directed to the specimen includes electrons, and the energy detected from the specimen includes electrons. In one such embodiment shown in FIG. 2, the inspection system includes electron column 122, and the system includes computer subsystem 124 coupled to the inspection system. Computer subsystem 124 may be configured as described above. In addition, such an inspection system may be coupled to another one or more computer systems in the same manner described above and shown in FIG. 1.

Figure 2:
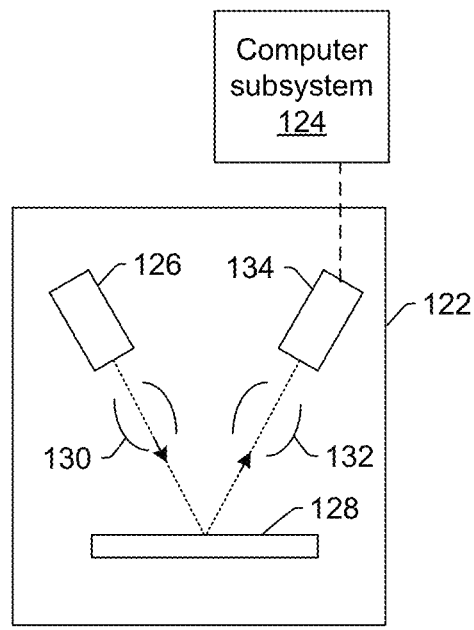

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam inspection system may be configured to use multiple modes to generate output for the specimen as described further herein (e.g., with different illumination angles, collection angles, etc.). The multiple modes of the electron beam inspection system may be different in any output generation parameters of the inspection system.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to input the output generated by detector 134 into a DL model, which may be performed as described further herein. Computer subsystem 124 may be configured to perform any additional step(s) described herein. A system that includes the inspection system shown in FIG. 2 may be further configured as described herein.

FIG. 2 is provided herein to generally illustrate a configuration of an electron beam inspection system that may be included in the embodiments described herein. As with the optical inspection system described above, the electron beam inspection system configuration described herein may be altered to optimize the performance of the inspection system as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection system is described above as being a light or electron beam inspection system, the inspection system may be an ion beam inspection system. Such an inspection system may be configured as shown in FIG. 2 except that the electron beam source may be replaced with any suitable ion beam source known in the art. In addition, the inspection system may include any other suitable ion beam inspection system such as those included in commercially available focused ion beam (FIB) systems, helium ion microscopy (HIM) systems, and secondary ion mass spectroscopy (SIMS) systems.

As further noted above, the inspection system may be configured to have multiple modes. In general, a "mode" is defined by the values of parameters of the inspection system used to generate output for the specimen. Therefore, modes that are different may be different in the values for at least one of the imaging parameters of the inspection system (other than position on the specimen at which the output is generated). For example, for a light-based inspection system, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the inspection system may include more than one illumination channel. As such, different illumination channels may be used for different modes.

The multiple modes may also be different in illumination and/or collection/detection. For example, as described further above, the inspection system may include multiple detectors. One of the detectors may be used for one mode and another of the detectors may be used for another mode. The modes may be different from each other in more than one way described herein (e.g., different modes may have one or more different illumination parameters and one or more different detection parameters). The inspection system may be configured to scan the specimen with the different modes in the same scan or different scans, e.g., depending on the capability of using multiple modes to scan the specimen at the same time.

Although the embodiments are described herein with respect to identifying one or more candidate modes for inspection of a specimen, the embodiments may also be configured for identifying candidate modes for other types of processes and tools. Such tools may include, for example, metrology tools, defect review tools, and the like. In some such instances, the other types of tools may be configured as described herein but with one or more changes. For example, the embodiments of the inspection systems described herein and shown in FIGS. 1 and 2 may be modified in one or more parameters to provide different imaging capability depending on the application for which they will be used. In one example, the inspection system shown in FIG. 2 may be configured to have a higher resolution if it is to be used for defect review or metrology rather than for inspection. In other words, the embodiments of the inspection system shown in FIGS. 1 and 2 describe some general and various configurations for an imaging subsystem that can be tailored in a number of manners that will be obvious to one skilled in the art to produce tools having different imaging capabilities that are more or less suitable for different applications.

As noted above, the inspection system may be configured for directing energy (e.g., light, electrons) to and/or scanning energy over a physical version of the specimen thereby generating actual output for the physical version of the specimen. In this manner, the inspection system may be configured as an "actual" inspection system, rather than a "virtual" system. However, a storage medium (not shown) and computer subsystem(s) 102 shown in FIG. 1 may be configured as a "virtual" system. In particular, the storage medium and the computer subsystem(s) are not part of inspection system 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No.9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

The system includes a computer subsystem, which may include any configuration of any of the computer subsystem(s) or system(s) described above, and one or more components executed by the computer subsystem. For example, as shown in FIG. 1, the system may include computer subsystem 36 and one or more components 104 executed by the computer subsystem.

The one or more components include a setup deep learning (DL) model configured for performing a number of functions related to inspection mode selection. In one embodiment, the setup DL model is not used for defect detection performed during the inspection of the specimen. For example, the setup DL models described herein may only be used for mode selection. In this manner, the setup DL models are referred to herein as "setup" DL models only because they are used only during the inspection recipe setup process and specifically for the mode selection portion of the setup. Once the best mode or best combination of modes is determined as described herein, the embodiments or another system or method may train a new DL model for defect detection, i.e., a "runtime" DL model, with the selected mode(s). In addition, the embodiments described herein may be used to select mode(s) for any inspection process including ones that do not use a DL model for defect detection. In other words, the embodiments described herein may be used to select mode(s) for any inspection process without regard to the defect detection method that will be used in that inspection process.

The setup DL model does not model any of the physics involved in the inspection process. Instead, the setup DL model is trained to perform functions based on output generated by different modes of the inspection system in a generative rather than a deterministic manner. The DL model may have or include any suitable DL architecture such as a convolutional neural network (CNN) architecture. The architecture of the DL model may be selected as described further herein. If the DL model is or includes a CNN, each of the CNN(s) may include any suitable types of layers such as convolution, pooling, fully connected, soft max, etc., layers having any suitable configuration known in the art. The architecture of the DL model may vary depending on the input to the DL model and/or the information for the specimen that is being determined since different DL architectures may be more suitable for different modes, processes, tools, etc. The DL model may be trained as described herein or in any other suitable manner known in the art.

In one embodiment, the computer subsystem is configured for selecting one or more parameters of the setup DL model based on all of the output generated for the specimen by each of the two or more modes. In another embodiment, the setup DL model is configured as a multi-mode DL model. For example, training phase (1A) 400 shown in FIG. 4 may involve training a DL model with all of the input multi-mode data available. More specifically, output generated by mode 1 (402), mode 2 (404), . . . , and mode N (406) may be used to train DL model 408. The output from modes 1, 2, . . . , and N, input to DL model 408 by the computer subsystem, may be generated or acquired by the inspection system and/or computer subsystem as described further herein. Training phase (1A) may therefore output a multi-mode DL model. The best DL model architecture may be found by performing an exhaustive grid search or DL model architecture optimization. The top performing architecture that gives the best performance is chosen as the final DL model. The output of training phase (1A) is the individual DL model and its baseline performance measure, e.g., baseline sensitivity 410. Once an architecture in set in training phase (1A), the embodiments preferably use the same DL model architecture through other steps shown in FIG. 4 to ensure consistency between the results of different steps.

Training the setup DL model may be performed in any suitable manner known in the art such as supervised training, unsupervised training, semi-supervised training, and the like. In one such example, supervised training of the DL model may include using labeled images of the specimen or another specimen that is the same type as the specimen. In this manner, the training may be performed using the runtime specimen or a setup specimen. The computer subsystem may obtain a dataset of labeled images and split them into train, test, and validation image sets. The computer subsystem may then perform supervised training, with validation, using a suitable DL model with the images and their labels as inputs. The labels may vary depending on the information that is being determined for the specimen (e.g., in the case of inspection, known or predicted defect locations, known or predicted nuisance locations, known or predicted defect free locations, etc.). The supervised training may otherwise be performed in any suitable manner known in the art.

Any of the training described above may be performed by the computer subsystem included in the embodiments described herein. In this manner, the embodiments described herein may be configured for performing one or more training functions for the setup DL model. However, any of the training described above may be performed by another method or system (not shown), and that other method or system may make the trained setup DL model accessible to the embodiments described herein for use in the mode selection embodiments described herein.

Figure 3:
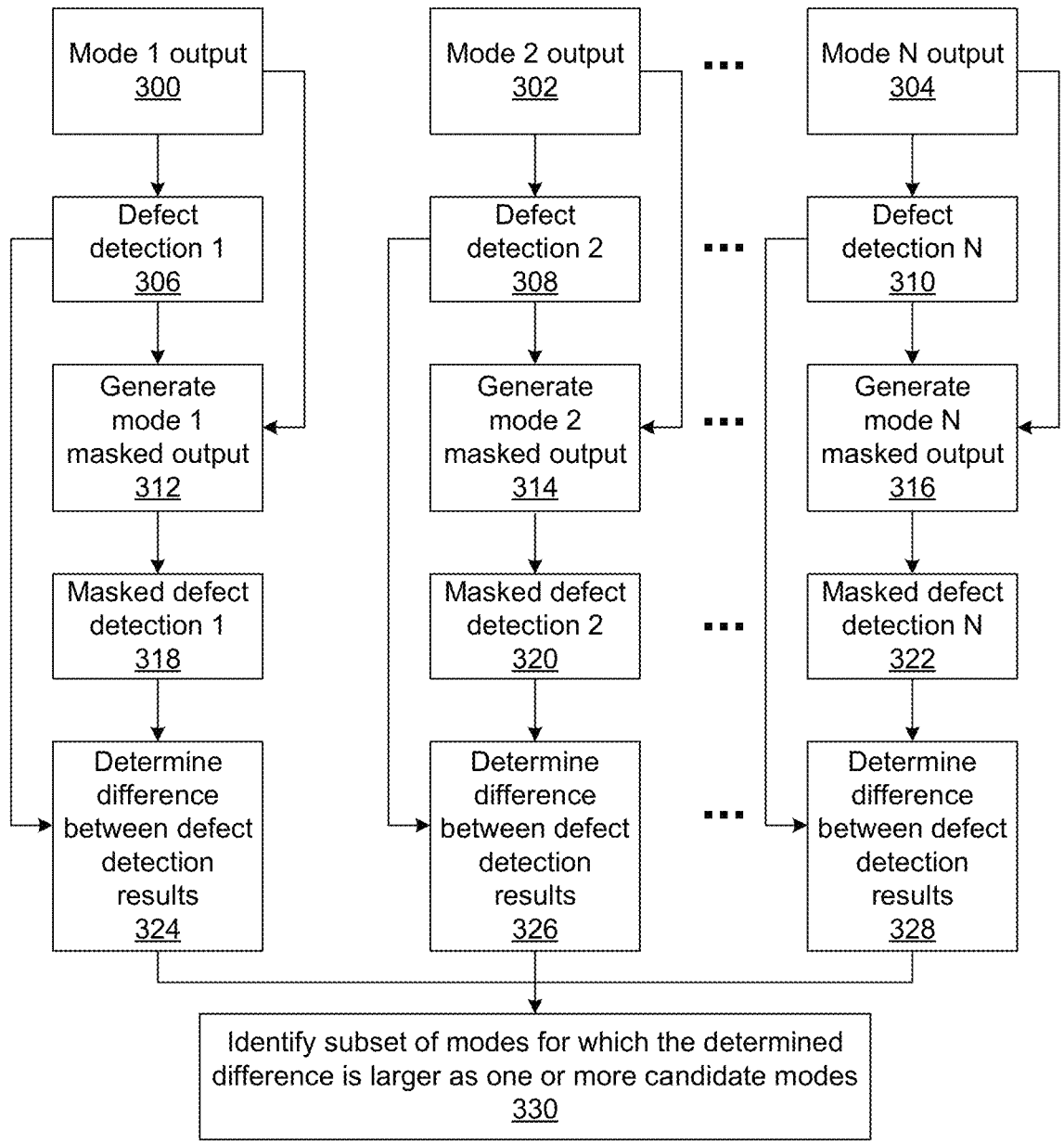
FIGS. 3-5 are flow charts illustrating embodiments of steps that may be performed for determining information for a specimen.

The setup DL model is configured for separately performing defect detection for a specimen based on output generated for the specimen by each of two or more modes of an inspection system, respectively. For example, as shown in FIG. 3, the DL model may be configured for performing defect detection 1 (306) with only mode 1 output 300, defect detection 2 (308) with only mode 2 output 302, . . . , and defect detection N (310) with only mode N output 304. Therefore, the number of defect detections performed in this phase of the mode selection may be equal to the number of modes being considered, and the input to each of the different defect detections may include only the output generated by the mode for which the defect detection is being performed. In other words, the computer subsystem may separately input the output generated with each of the different modes to the setup DL model. The computer subsystem may input the mode outputs into the setup DL model in any suitable manner.

The mode outputs that are input to the DL model may include any of the inspection system output described further herein such as images, image data, signals, image signals, etc. The mode outputs that are input to the setup DL model may include the raw detector output, meaning that the detector output is not processed in any manner prior to being used for defect detection. However, the input to the setup DL model may include mode output that has been processed in some manner as it might be in a normal inspection process. Such processing may include, for example, high pass filtering, image alignment, and the like. In this manner, the input to the setup DL model may be the same as if an inspection process was being performed with the mode output.

Regardless of the mode, the input to the setup DL model may include not just detector output, processed or not, generated for the specimen by that mode. For example, the input to the setup DL model for any of the defect detections may include additional information such as one or more reference images corresponding to one or more specimen images, one or more difference images generated by subtracting a reference specimen image from a test specimen image, design information for the specimen, and the like. In this manner, for any one mode and any one defect detection performed by the setup DL model, there may be multiple channels of input into the setup DL model for that mode.

The inputs to the DL model may vary depending on the type of inspection performed by the setup DL model. For example, the input to the DL model may only include the mode output for a die-to-die type inspection, but the input to the DL model may include the mode output and a reference for a die-to-database type inspection. Obviously, these are just two examples of types of defect detections that the setup DL model may be configured for, and which inputs are used to train the setup DL model and/or how the setup DL model is trained will ultimately control how the setup DL model performs the defect detections and with which inputs.

The computer subsystem is configured for separately generating masked output for each of the two or more modes, respectively, by determining a single output value from the output generated for at least a portion of a specimen and replacing all of the output generated for the at least the portion of the specimen with the single output value. In one embodiment, the single output value is a single median value. For example, the computer subsystem may generate mode 1 masked output in step 312 based on mode 1 output 300, generate mode 2 masked output in step 314 based on mode 2 output 302, . . . , and generate mode N masked output in step 316 based on mode N output 304. Masking an input mode may include replacing all the pixel values of that input mode with the median value of the entire specimen. In other words, for a particular mode within a given job, all the pixel values for that mode may be replaced by the median value. While a median value of all the pixels may be particularly suitable for the masking step, other types of values that are responsive to the values of the output generated by a mode for at least a job or relatively large area on a specimen may be used for masking. The median or other suitable type of value may be determined in any suitable manner.

The at least the portion of the specimen for which the masked output is generated may preferably include all of the specimen for which the output was generated by any one mode. This area of the specimen may be the same for each mode, but that is not necessarily the case, such as when one mode fails to generate any output for some of the specimen. In addition, the mode output that is used for any of the steps described herein may or may not include all of the output generated by any one mode for the specimen. For example, in some cases, it may be advantageous to generate output for as much of the specimen as possible with any one mode, which may be determined by the known or anticipated area that will be inspected during specimen inspection. However, in the interest of saving time and resources, for any one mode, less than all of this output may be used in any of the steps performed herein. For example, instead of using all of the mode output generated for an entire specimen in a step described herein, the mode output used may be mode output generated for only half of the specimen, mode output generated for a number of limited areas on the specimen such as one center area and one edge area or a limited number of die areas on the specimen, etc. In other words, the amount of mode output used for any one step described herein may be judiciously selected to reduce the amount of time and resources used without compromising the accuracy of the results.

The setup DL model is also configured for separately re-performing defect detection for the specimen based on masked output generated for each of the two or more modes, respectively. For example, the setup DL model may perform masked defect detection 1 (318) based on mode 1 masked output generated in step 312, masked defect defection 2 (320) based on mode 2 masked output generated in step 314, . . . , and masked defect detection N (322) based on mode N masked output generated in step 316. In this manner, the setup DL model may perform a number of masked defect detections, one for each mode.

The setup DL model may use the masked mode outputs in the same manner as the mode outputs, and the masked mode outputs may be input to the setup DL model in the same manner as the mode outputs. In other words, the setup DL model may perform the same defect detection using the original mode output and the masked mode output. In addition, in order to compare the defect detection results generated with the original and masked mode output for any one mode as described further herein, the setup DL model is preferably not re-trained between the defect detections and the masked defect detections, and the defect detections and masked defect detections are preferably performed in the same manner. In other words, the parameters of the setup DL model used for the defect detections and the masked defect detections are preferably the same.

Figure 4:
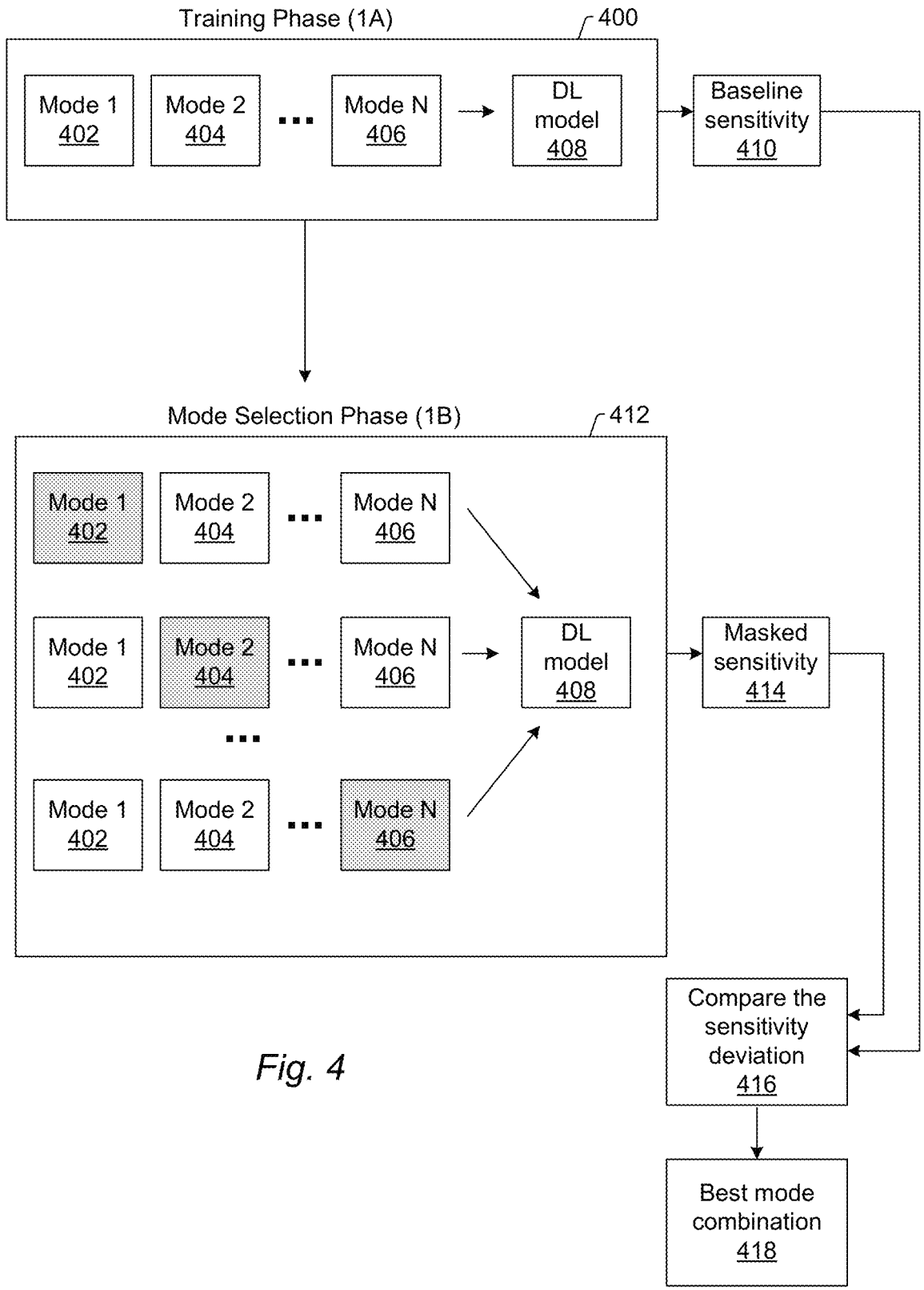

In another example, mode selection phase (1B) 412 shown in FIG. 4 may include running inference on the trained setup DL model while masking the input modes. Inference may be run N times where N is the number of input modes. Masked modes are shown in mode selection phase (1B) by the light gray shading. As shown in FIG. 4, for different inputs to DL model 408, which in phase (1B) is the trained setup DL model, shown in different rows in the figure, different modes are masked. In particular, for the first input shown in the first row, mode 1 is masked. For the second input shown in the second row, mode 2 is masked, and so on. For each iteration, the computer subsystem may record the input modes sensitivity, e.g., masked sensitivity 414.

In some embodiments, the setup DL model is configured for separately re-performing the defect detection for the specimen based on the masked output generated for at least one combination of the two or more modes. As described further herein, this phase may also include running inference by masking multiple combinations of the N modes, which may be performed to analyze the coupling effect between different modes. For example, if the embodiments are masking a combination of modes 1, 2, and 3, then all pixel values of modes 1, 2, and 3 are masked by their respective mean values and given as input to the DL model.

The computer subsystem is also configured for determining a difference between results of separately performing defect detection and separately re-performing defect detection for each of the two or more modes, respectively. For example, as shown in FIG. 3, the results of defect detection 1 (306) and masked defect detection 1 (318) may be input to determining difference between defect detection results step 324 performed for mode 1, the results of defect detection 2 (308) and masked defect detection 2 (320) may be input to determining difference between defect detection results step 326 performed for mode 2, . . . , and the results of defect detection N (310) and masked defect detection N (322) may be input to determining difference between defect detection results step 328 performed for mode N. In another example, as shown in FIG. 4, the computer subsystem may perform compare the sensitivity deviation step 416, which may include comparing the masked input mode performance, e.g., masked sensitivity 414, with the baseline performance, e.g., baseline sensitivity 410.

Determining the differences between the results of the different detections for any one mode may include as described above determining a difference in the sensitivity between the two defect detections. The sensitivity of each of the defect detections may be determined or quantified in any suitable manner. For example, the sensitivity may be determined as the smallest defect size that is detected by a mode, how many DOIs are detected by a mode, how many nuisances are detected by a mode, how many DOIs versus nuisances are detected by a mode, characteristics of the mode output determined in a defect detection like a noise floor value, etc. In other words, any results produced by a defect detection that are responsive to how well the defect detection performs may be used to determine a difference between unmasked and masked defect detection results for a mode.

The computer subsystem is further configured for identifying a subset of the two or more modes for which the determined difference is larger than others of the two or more modes as one or more candidate modes for inspection of the specimen, as shown in step 330 of FIG. 3. In this manner, each of the determined differences generated by steps 324, 326, . . . , and 328 may be input to step 330, and the computer subsystem may compare the determined differences to each other to determine which are the largest.

This step may include determining which of a predetermined number of the modes have differences that are larger than other modes. The predetermined number may be determined in a variety of ways such as an integer number of modes, a percentage of the modes, modes whose difference is greater than other modes by at least a predetermined amount or percentage, etc. The predetermined number may be selected in a number of manners including, for example, being selected by a user. As shown in FIG. 4, the computer subsystem may determine the best mode combination in step 418 based on the results of comparing the sensitivity deviation in step 416.

This step therefore takes advantage of the fact that by masking the output as described herein, any defect signals present in the input image are essentially eliminated. Therefore, if a given mode has "good" signal, then by masking it, there will be a significant drop in performance. On the other hand, if a mode is "bad," meaning that it does not have any defect signal or has relatively little defect signal, then masking that mode will not cause any significant drop in detection performance. In this manner, modes that have the lowest determined differences may be low contribution modes, meaning that they contribute little to the sensitivity of the defect detection.

The one or more candidate modes identified in step 330 of FIG. 3 or step 418 of FIG. 4 may or may not be used for the inspection. For example, the identified one or more candidate modes may all be used for inspection. However, identifying a portion of the modes as candidate modes as described above may be performed to determine fewer than all of the possible (or considered) modes that are worthwhile to examine further to determine the final inspection mode or modes. Such further analysis may include identifying and eliminating coupled modes, which may be performed as described herein. Further analysis may also include setting up other parameters of the inspection such as image or data processing parameters for use with the candidate mode(s), which may result in eliminating one or more of the candidate modes as suitable for inspection. The analysis may include determining the fewest number of the candidate modes that can meet the goals of inspection, which may be defined in a number of ways such as, for example, capturing all of the DOIs on a specimen, capturing the DOIs at a predetermined capture rate, capturing at least some of the DOIs with a nuisance detection rate below some predetermined value, etc. Therefore, only a smaller subset of the candidate mode(s) may be used for inspection, and that smaller subset may be determined as described herein or in any other suitable manner known in the art.

In some embodiments, the computer subsystem is configured for quantitatively ranking each of the two or more modes based on the determined difference. For example, the embodiments described herein can quantitatively rank each mode based on its contribution to the final performance metric. In one such example, the candidate mode with the greatest difference value may be assigned the highest ranking, the candidate mode with the next greatest difference value may be assigned the next highest ranking, and so on. In this manner, the embodiments described herein provide a quantitative way to rank inspection modes based on how sensitive they are to DOIs.

In one embodiment, the two or more modes include modes included in a coupling group. The term "coupling modes" used interchangeably herein with the term "coupled modes" is defined as modes that contain the same redundant information as its partner coupling mode(s), which is/are within the same coupling group. Multi-mode DL models are usually biased to the modes that have the highest contribution to sensitivity. In other words, when a DL model is trained with modes that belong to a coupled group, the DL model is almost always biased toward one of the modes. This biased mode usually tends to have a higher signal strength and input dynamic range compared to the other coupled modes. The embodiments described herein exploit this property and identify the top modes as described further herein as the modes whose masked sensitivity significantly deviates from the baseline sensitivity. Similarly, modes that have the lowest masked-to-baseline deviations are labeled as low contribution modes or "coupled modes."

In one such embodiment, the computer subsystem is configured for separately training the setup DL model as a single mode DL model for each of the modes in the coupling group, respectively. For example, identifying coupled modes may include training a single mode DL model on modes that belong to a specific coupling group. In other words, the DL model may be trained for each mode within a coupling group to verify if they are coupled modes. Such training may be performed as described further herein.

In another embodiment, the computer subsystem is configured for identifying a first portion of the modes in the coupling group that have a higher sensitivity for the inspection than a second portion of the modes in the coupling group. Identifying coupling modes may therefore also include identifying the modes that have the highest sensitivity. This step may also be performed as described further herein or in any other suitable manner known in the art.

In some embodiments, identifying the first portion includes separately performing the defect detection, separately re-performing the defect detection, separately generating the masked output, and separately determining the difference for each of the modes in the coupling group and identifying the first portion as the modes in the coupling group for which the determined difference is larger than others of the modes in the coupling group. These steps may be performed as described further herein, e.g., comparing the masked sensitivity to the baseline sensitivity and determining which of the modes in the coupling group have a greater sensitivity based on the differences between the sensitivities. For example, when input mode perturbation is performed on coupled modes, a biased mode usually has a mode contribution response that significantly outperforms the other modes. But when a single mode DL model is trained using these coupled modes, the DL model usually has a similar performance metric. Therefore, even if two modes have mode contribution responses that significantly outperform the other modes, a single mode DL model trained using these modes may have a similar performance metric, meaning they are capable of providing the same inspection results. Since there is most often no reason to use two modes in an inspection process that provide basically the same inspection results, identifying these modes is an important part of identifying the best modes for inspection in addition to identifying the fewest number of modes that can meet the inspection goals.

In a further embodiment, the computer subsystem is configured for re-training the setup DL model as a multi-mode DL model with the output generated for the specimen by only the first portion of the modes. For example, identifying the coupled modes may include training a multi-mode DL model using the above-mentioned top performing K modes. Such training may be performed as described further herein.

In an additional embodiment, the re-trained setup DL model is configured for separately performing multi-mode defect detection for the specimen based on different combinations of the masked output generated for each of the modes in the first portion, respectively, with the output generated for each other of the modes in the first portion. In this manner, identifying the coupled modes may include running masked inference for each mode. In this step, masked inference may be run for each mode collectively. For example, if we have 10 modes, and mode 1 is currently being masked, mode 1 is masked and inference is run for modes 1—modes 10 collectively as input. Masking the modes and performing the multi-mode defect detection may otherwise be performed as described further herein.

In one embodiment, the computer subsystem is configured for determining if the re-trained setup DL model is biased to one or more modes in the first portion based on results of separately performing the multi-mode defect detection. For example, the computer subsystem may determine if the multi-mode DL model is biased to a smaller subset of the K modes. Determining if the re-trained setup DL model is biased to a smaller subset of the K modes may be performed as described further herein, e.g., by comparing the sensitivities of all of the separately performed multi-mode defect detections to each other, the mode(s) whose masking caused the biggest difference(s) in the inspection sensitivity may be identified as the biased mode(s) in the first portion.

In another embodiment, the computer subsystem is configured for determining if the re-trained setup DL model is biased to two or more modes in the first portion based on results of separately performing the multi-mode defect detection, and when the computer subsystem determines the re-trained setup DL model is biased to the two or more modes in the first portion, identifying the two or more modes in the first portion as coupled modes. For example, if the computer subsystem determines that the multi-mode DL model is biased to a smaller subset of the K modes, then the computer subsystem may determine that these modes are "coupled modes." Determining if the re-trained setup DL model is biased to two or more modes may be performed as described further herein. In this manner, the embodiments described herein may identify two or more modes that provide essentially the same inspection sensitivity and therefore essentially the same inspection results.

In a further embodiment, the computer subsystem is configured for eliminating all but one of the coupled modes from the coupling group. For example, the embodiments described herein can identify and eliminate "coupling" modes defined as modes that contain the same redundant information. In particular, coupled modes are most of the time "good" modes, but usually within a coupled group, only the top mode in that group is required because all the other modes within that group contain the same redundant information. Eliminating all but one of the coupled modes from further consideration and/or use in the inspection process may be performed arbitrarily or based on some information about the coupled modes, such as which of the coupled modes is the simplest or fastest, which of the coupled modes is easiest to implement, which of the coupled modes is known to historically be useful for inspection, which of the coupled modes can be used to simultaneously scan a specimen with any other non-coupled mode selected for inspection (as opposed to sequential mode scanning), etc.

In another embodiment, the computer subsystem is configured for separately training the setup DL model for each of the two or more modes of the inspection subsystem, at least one combination of the two or more modes in the subset, and not any other possible combinations of the two or more modes. Any or all of such training may be performed as described further herein. In this manner, one advantage of the embodiments described herein is that they significantly reduce the number of DL model training operations performed from an exponential number currently performed by mode selection methods and systems to a linearly scaled number of training operations for identifying the top performing modes. In this manner, the embodiments described herein can significantly improve the time to result at recipe setup by reducing the number of training operations. Furthermore, since the embodiments described herein may involve training only one DL model, the embodiments described herein can scale efficiently as the number of modes on the input space scales up.

In some embodiments, the computer subsystem is configured for training an additional DL model configured for performing the defect detection or another defect detection for the specimen or another specimen based on results generated by the setup DL model or the computer subsystem. For example, the embodiments described herein can identify the best performing input modes that can be used to guide and train other supervised models to further improve their defect detection performance in an iterative manner. In one such example, the final trained DL model can be used as a teacher to guide and train student models in an ensemble manner to learn to identify DOIs with minimal data. The embodiments described herein are able to use a substantially minimal amount of data compared to training of other supervised models for identifying the best modes. In this case, a minimal amount of data refers to a minimum amount of modes. Since the embodiments described herein are able to use a substantially minimal amount of the data for training comparable supervised models, the embodiments described herein reduce the computation time during inference.

Figure 5:
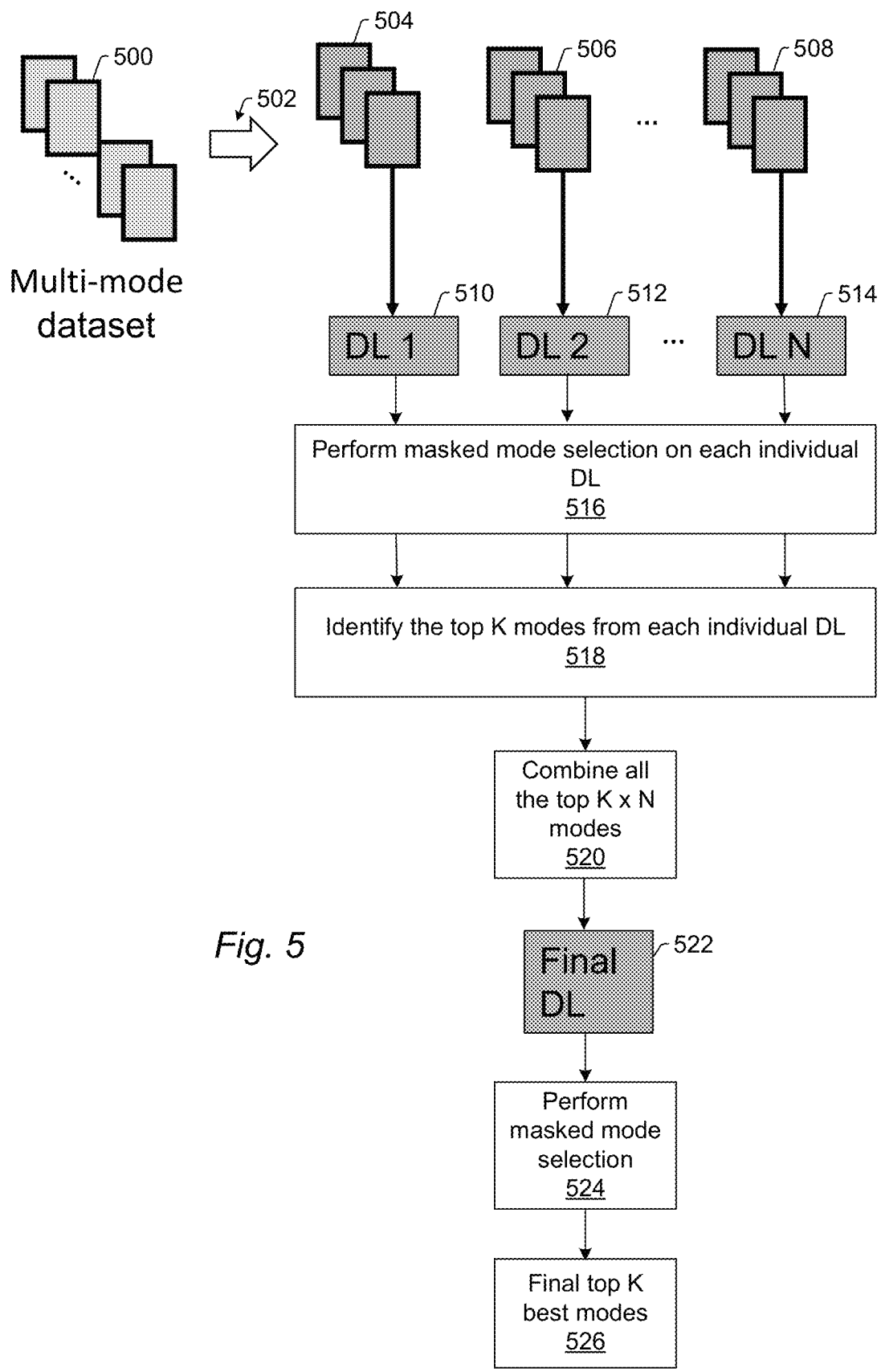

Different approaches may be used by the embodiments described herein depending on the number of modes that are possible on the inspection system and/or that are being considered for inspection of the specimen. FIG. 5 illustrates one embodiment that may be used when the number of modes under consideration is substantially large (e.g., more than 50 modes). For example, when the hardware and computational resources are somewhat limited, it can be substantially difficult to fit input data with such a large number of input modes into a graphics processing unit (GPU) memory. In this embodiment, the computer subsystem may acquire multi-mode dataset 500, which may be acquired as described further herein and may include any of the mode output described herein. In step 502, the computer subsystem may split the dataset into N random partitions along the channel axis, which may include partitions 504, 506, . . . , and 508. The value of N may be empirically chosen based on the number of modes and dataset size. Each of the partitioned datasets may be input to a DL model as described herein. In particular, partition 504 may be input to DL model 1 (510), partition 506 may be input to DL model 2 (512), . . . , and partition 508 may be input to DL model N (514). Each of these DL models may be configured as described further herein. In addition, each of the DL model 1, DL model 2, . . . , and DL model N may be different instances of the same DL model.

After splitting the dataset into N partitions, masked mode selection is performed for each partition individually. The output generated by each of the DL models may be separately input to perform masked mode selection on each individual DL, as shown in step 516. In this manner, step 516 may be performed N number of times, once for each of the data partitions. Masked mode selection may be performed in step 516 as described further herein.

The computer subsystem may also identify the top K modes from each individual partition, as shown in step 518. In this manner, step 518 may be separately performed N number of times, once for each of the different masked mode selections in step 516. The computer subsystem may identify the top K modes in step 518 as described further herein.

To elaborate further on how masked mode selection for individual partitions may be performed in steps 516 and 518, for each data partition, the computer subsystem may train a DL model and then perform masked mode selection during inference. Given a data partition with C modes, the computer subsystem masks the first mode by replacing all the pixel values in that mode by the median value of that mode. The computer subsystem then passes this data through the trained DL model and observes the deviation in performance. These steps are repeated for all the C modes. The top K modes with the highest deviations in performance are the best modes for that data partition. These steps are then repeated for all data partitions.

The results of the N partition masked mode selection step include K modes for each individual partition, resulting in K×N modes. The computer subsystem combines all the top K×N modes in step 520, which include all of the top K modes identified for each data partition. Combining all the top K×N modes may include acquiring the top K modes from each instance of step 518 that is performed and then acquiring all the data in multi-mode dataset 500 (or each of the different data partitions) generated by each of the top K×N modes. After combining all of the K×N modes, the computer subsystem may train one final DL model 522, which may be performed as described further herein. The final DL model may be configured as described further herein, and the computer subsystem may input the K×N mode data into the model as described further herein.

The computer subsystem may also perform masked mode selection, as shown in step 524. This step may include inputting the acquired K×N mode data into final DL model 522 and performing masked mode selection based on the output generated by final DL model 522. This masked mode selection step may be performed as described further herein. The computer subsystem may then identify the final top K best modes in step 526 based on the results generated by the masked mode selection step. The resulting $K_{final}$ modes after this step are the final best performing K modes. The computer subsystem may identify the final top K best modes as described further herein.

Although mode selection such as that shown in FIG. 5 may increase the number of mode selection steps compared to other embodiments described herein, the number of steps is still significantly less than that involved in currently used methods such as a Brute Force approach. The approach shown in FIG. 5 also has the potential to address the issue of coupling modes, which may be identified and eliminated as described further herein. Since the modes are split randomly, the chances of finding coupled modes in the same partition decreases compared to when all of the modes are considered together. In some instances, identifying coupling modes may be performed as described herein after the top K×N modes are combined instead of or in addition to being performed to identify the top K modes in each partition.

The embodiments described herein provide a number of significant improvements and advantages for mode selection compared to currently used methods and systems. For example, the embodiments described herein may train a DL model just once for mode selection regardless of the number of input modes within a range of 1-1000. Compared to the currently used mode selection methods and systems, the embodiments described herein can guarantee that the selected mode or modes is the best mode or best mode combination. In addition, the embodiments described herein can improve the performance during inference compared to the currently used methods and systems. Furthermore, the embodiments described herein can reduce the compute time during inference without significantly compromising on performance throughout. The embodiments described herein also generally reduce compute time and resources. Another important new feature of the embodiments described herein is that they have the ability to identify and eliminate coupling modes, which the previously used approaches are not capable of. The embodiments described herein further have the ability to find a subset of data that can be used to achieve similar performance as the whole dataset. The embodiments described herein also are widely applicable to a variety of tools and processes such as broadband inspection tools, laser scattering inspection tools, wafer inspection tools, reticle inspection tools, etc. and can improve the time to results and reduce cost of ownership for single and multi-mode selection on such tools.

In some embodiments, the computer subsystem is configured for storing information for the candidate mode(s) and/or the final mode(s) for use in a process such as inspection of the specimen. The computer subsystem may be configured to store the information in a recipe or by generating a recipe for the process in which the candidate and/or final mode(s) will be used. A "recipe" as that term is used herein can be generally defined as a set of instructions that can be used by a tool to perform a process on a specimen. In this manner, generating a recipe may include generating information for how a process is to be performed, which can then be used to generate the instructions for performing that process. The information for the selected candidate and/or final mode(s) that is stored by the computer subsystem may include any information that can be used to identify and/or use the selected mode(s) (e.g., such as a file name and where it is stored, and the file may include information for the modes such as mode names, mode parameter values, etc.).

The computer subsystem may be configured for storing the information for the selected mode(s) in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate an inspection recipe as described above. That inspection recipe may then be stored and used by the system or method (or another system or method) to inspect the specimen or other specimens to thereby generate information (e.g., defect information) for the specimen or other specimens.

The computer subsystem and/or the inspection system may be configured to use the results of the one or more steps described herein to perform the inspection process on the specimen and/or other specimens of the same type. Such an inspection process may produce results for any defects detected on the specimen(s) such as information, e.g., location, etc., of the bounding boxes of the detected defects, detection scores, information about defect classifications such as class labels or IDs, etc., or any such suitable information known in the art. The results for the defects may be generated by the computer subsystem and/or inspection system in any suitable manner. The results for the defects may have any suitable form or format such as a standard file type. The computer subsystem and/or inspection system may generate the results and store the results such that the results can be used by the computer subsystem and/or another system or method to perform one or more functions for the specimen(s) or another specimen of the same type. For example, that information may be used by the computer subsystem or another system or method for sampling the defects for defect review or other analysis, determining a root cause of the defects, etc.

Functions that can be performed using such information also include, but are not limited to, altering a process such as a fabrication process or step that was or will be performed on the inspected specimen or another specimen in a feedback or feedforward manner. For example, the computer subsystem may be configured to determine one or more changes to a process that was performed on a specimen inspected as described herein and/or a process that will be performed on the specimen based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art. Such changes may also be determined using results of other processes described herein.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or inspection system described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

As described herein, therefore, the embodiments can be used to setup a new process or recipe. The embodiments may also be used to modify an existing process or recipe, whether that is a process or recipe that was used for the specimen or was created for one specimen and is being adapted for another specimen.

Each of the embodiments described above may be combined together into one single embodiment. In other words, unless otherwise noted herein, none of the embodiments are mutually exclusive of any other embodiments.

Another embodiment relates to a computer-implemented method for determining information for a specimen. The method includes separately performing defect detection for a specimen (e.g., defect detection 1 (306), defect detection 2 (308), . . . , and defect detection N (310) shown in FIG. 3) by inputting output (e.g., mode 1 output 300, mode 2 output 302, . . . , and mode N output 304) generated for the specimen by each of two or more modes of an inspection system (e.g., inspection system 100 shown in FIG. 1), respectively, into a setup DL model (e.g., DL model 408 shown in FIG. 4) included in one or more components (e.g., one or more components 104 shown in FIG. 1) executed by a computer system (e.g., computer subsystem 36).

The method also includes separately generating masked output for each of the two or more modes, respectively, (e.g., generate mode 1 masked output 312, generate mode 2 masked output 314, . . . , and generate mode N masked output 316, as shown in FIG. 3) by determining a single output value from the output generated for at least a portion of the specimen and replacing all of the output generated for the at least the portion of the specimen with the single output value. In addition, the method includes separately re-performing defect detection for the specimen by inputting the masked output generated for each of the two or more modes, respectively, into the setup DL model (e.g., masked defect detection 1 (318), masked defect detection 2 (320), . . . , and masked defect detection N (322)).

The method further includes determining a difference between results of separately performing the defect detection and separately re-performing the defect detection for each of the two or more modes, respectively, (e.g., determine difference between defect detection results steps 324, 326, . . . , and 328) and identifying a subset of the two or more modes for which the determined difference is larger than others of the two or more modes as one or more candidate modes for inspection of the specimen (e.g., as shown in step 330 of FIG. 3). Inputting the output, separately generating the masked output, inputting the masked output, determining the difference, and identifying the subset are performed by the computer system, which may be configured according to any of the embodiments described herein.

Each of the steps of the method may be performed as described further herein. The method may also include any other step(s) that can be performed by the inspection system and/or computer system described herein. In addition, the method described above may be performed by any of the system embodiments described herein.

Figure 6:
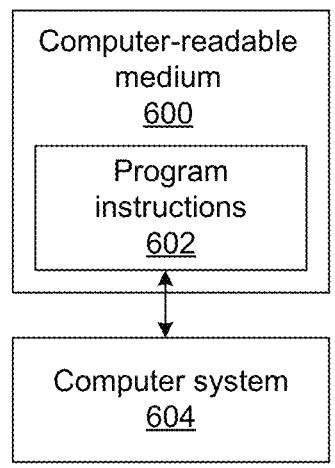
FIG. 6 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 6. In particular, as shown in FIG. 6, non-transitory computer-readable medium 600 includes program instructions 602 executable on computer system 604. The computer-implemented method may include any step(s) of any method(s) described herein.

Program instructions 602 implementing methods such as those described herein may be stored on computer-readable medium 600. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++objects, JavaBeans, Microsoft Foundation Classes ("MFC"), SSE (Streaming SIMD Extension), Python, Tensorflow, or other technologies or methodologies, as desired.

Computer system 604 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for determining information for a specimen, comprising:
   a computer subsystem; and
   one or more components executed by the computer subsystem, wherein the one or more components comprise a setup deep learning model configured for:
   separately performing defect detection for a specimen based on output generated for the specimen by each of two or more modes of an inspection system, respectively; and
   separately re-performing defect detection for the specimen based on masked output generated for said each of the two or more modes, respectively; and wherein the computer subsystem is configured for:
    separately generating the masked output for said each of the two or more modes, respectively, by determining a single output value from the output generated for at least a portion of the specimen and replacing all of the output generated for the at least the portion of the specimen with the single output value;
    determining a difference between results of said separately performing defect detection and said separately re-performing defect detection for said each of the two or more modes, respectively; and
    identifying a subset of the two or more modes for which the determined difference is larger than others of the two or more modes as one or more candidate modes for inspection of the specimen.

2. The system of claim 1, wherein the computer subsystem is further configured for selecting one or more parameters of the setup deep learning model based on all of the output generated for the specimen by said each of the two or more modes.

3. The system of claim 1, wherein the computer subsystem is further configured for separately training the setup deep learning model for said each of the two or more modes of the inspection subsystem, at least one combination of the two or more modes in the subset, and not any other possible combinations of the two or more modes.

4. The system of claim 1, wherein the setup deep learning model is further configured as a multi-mode deep learning model.

5. The system of claim 1, wherein the single output value is a single median value.

6. The system of claim 1, wherein the setup deep learning model is further configured for separately re-performing the defect detection for the specimen based on the masked output generated for at least one combination of the two or more modes.

7. The system of claim 1, wherein the two or more modes comprise modes included in a coupling group.

8. The system of claim 7, wherein the computer subsystem is further configured for separately training the setup deep learning model as a single mode deep learning model for each of the modes in the coupling group, respectively.

9. The system of claim 8, wherein the computer subsystem is further configured for identifying a first portion of the modes in the coupling group that have a higher sensitivity for the inspection than a second portion of the modes in the coupling group.

10. The system of claim 9, wherein identifying the first portion comprises performing said separately performing, said separately re-performing, said separately generating, and said determining for said each of the modes in the coupling group and identifying the first portion as the modes in the coupling group for which the determined difference is larger than other of the modes in the coupling group.

11. The system of claim 9, wherein the computer subsystem is further configured for re-training the setup deep learning model as a multi-mode deep learning model with the output generated for the specimen by only the first portion of the modes.

12. The system of claim 11, wherein the re-trained setup deep learning model is configured for separately performing multi-mode defect detection for the specimen based on different combinations of the masked output generated for each of the modes in the first portion, respectively, with the output generated for each other of the modes in the first portion.

13. The system of claim 12, wherein the computer subsystem is further configured for determining if the re-trained setup deep learning model is biased to one or more modes in the first portion based on results of said separately performing the multi-mode defect detection.

14. The system of claim 12, wherein the computer subsystem is further configured for determining if the re-trained setup deep learning model is biased to two or more modes in the first portion based on results of said separately performing the multi-mode defect detection, and when the computer subsystem determines that the re-trained setup deep learning model is biased to the two or more modes in the first portion, identifying the two or more modes in the first portion as coupled modes.

15. The system of claim 14, wherein the computer subsystem is further configured for eliminating all but one of the coupled modes from the coupling group.

16. The system of claim 1, wherein the computer subsystem is further configured for quantitatively ranking said each of the two or more modes based on the determined difference.

17. The system of claim 1, wherein the computer subsystem is further configured for training an additional deep leaning model configured for performing the defect detection or another defect detection for the specimen or another specimen based on results generated by the setup deep learning model or the computer subsystem.

18. The system of claim 1, wherein the setup deep learning model is not used for defect detection performed during the inspection of the specimen.

19. A non-transitory computer-readable medium, storing program instructions executable on a computer system for performing a computer-implemented method for determining information for a specimen, wherein the computer-implemented method comprises:
    separately performing defect detection for a specimen by inputting output generated for the specimen by each of two or more modes of an inspection system, respectively, into a setup deep learning model included in one or more components executed by the computer system;
    separately generating masked output for said each of the two or more modes, respectively, by determining a single output value from the output generated for at least a portion of the specimen and replacing all of the output generated for the at least the portion of the specimen with the single output value;
    separately re-performing defect detection for the specimen by inputting the masked output generated for said each of the two or more modes, respectively, into the setup deep learning model;
    determining a difference between results of said separately performing defect detection and said separately re-performing defect detection for said each of the two or more modes, respectively; and
    identifying a subset of the two or more modes for which the determined difference is larger than others of the two or more modes as one or more candidate modes for inspection of the specimen, wherein said inputting the output, separately generating, inputting the masked output, determining, and identifying are performed by the computer system.

20. A computer-implemented method for determining information for a specimen, comprising:
    separately performing defect detection for a specimen by inputting output generated for the specimen by each of two or more modes of an inspection system, respectively, into a setup deep learning model included in one or more components executed by a computer system;

separately generating masked output for said each of the two or more modes, respectively, by determining a single output value from the output generated for at least a portion of the specimen and replacing all of the output generated for the at least the portion of the specimen with the single output value;

separately re-performing defect detection for the specimen by inputting the masked output generated for said each of the two or more modes, respectively, into the setup deep learning model;

determining a difference between results of said separately performing defect detection and said separately re-performing defect detection for said each of the two or more modes, respectively; and identifying a subset of the two or more modes for which the determined difference is larger than others of the two or more modes as one or more candidate modes for inspection of the specimen, wherein said inputting the output, separately generating, inputting the masked output, determining, and identifying are performed by the computer system.

* * * * *